United States Patent [19]

Elterman

[11] 4,318,591
[45] Mar. 9, 1982

[54] POLARIZATION SWITCHED IMAGE ROTATOR

[75] Inventor: Paul B. Elterman, Costa Mesa, Calif.

[73] Assignee: Ford Aerospace & Communications Corp., Detroit, Mich.

[21] Appl. No.: 158,104

[22] Filed: Jun. 10, 1980

[51] Int. Cl.³ .......................... F41G 9/00; G02F 1/03
[52] U.S. Cl. ................................. 350/374; 350/383; 350/384; 350/400; 244/3.13
[58] Field of Search ................ 350/21, 22, 23, 374, 350/376, 380, 383, 384, 400, 403; 224/3.13

[56] References Cited

U.S. PATENT DOCUMENTS

| | | |
|---|---|---|
| 2,625,853 | 1/1953 | Hayward ............................ 350/23 |
| 3,398,918 | 8/1968 | Girault . |
| 3,527,520 | 9/1970 | Harris . |
| 3,609,007 | 9/1971 | Peek . |
| 3,625,592 | 12/1971 | Beasley . |
| 3,630,595 | 12/1971 | Peek . |
| 3,744,875 | 7/1973 | Haertling et al. . |
| 3,753,608 | 8/1973 | Bernal . |
| 3,900,247 | 8/1975 | Zaky . |
| 3,910,676 | 10/1975 | Rushworth et al. . |
| 4,047,117 | 9/1977 | Tuchyner et al. ............... 244/3.16 |
| 4,111,385 | 9/1978 | Allen ............................... 244/3.13 |
| 4,186,899 | 2/1980 | Stewart ........................... 244/3.13 |

*Primary Examiner*—R. A. Rosenberger
*Attorney, Agent, or Firm*—Paul K. Godwin, Jr.; Clifford L. Sadler

[57] ABSTRACT

A beam projector capable of projecting alternately orthogonally oriented cross-sectional beams by utilizing a single beam generator that emits a polarized beam through an electro-optical cell, which is activated to alternately switch the beam between two orthogonal plane polarization states. The respectively alternately polarized beams are imaged into an elongated cross-sectional beam wherein one of the beams of one of the polarizations states is rotated orthogonally with respect to the other beam and the beams are projected along parallel paths.

17 Claims, 2 Drawing Figures

POLARIZATION SWITCHED IMAGE ROTATOR

BACKGROUND OF THE INVENTION

1. Field of the Invention

The present invention is in the field of electromagnetic beam radiation systems and more particularly in the area of polarization image rotation switching systems.

2. Description of the Prior Art

Several prior art systems have been developed which project orthogonally oriented elongated beams for the purpose of providing guidance information to beam-rider type missles.

U.S. Pat. No. 3,398,918 discloses two embodiments of an optical beam-rider guidance system beam projector. In the first embodiment, four elongated beams of infra-red electromagnetic radiation are separately generated and amplitude modulated to produce four distinguishable walls of a guidance control corridor. Each beam is derived from a separate laser generator positioned to emit a beam of light through a pair of crossed polarizers separated by an amplitude modulating birefringent medium. The birefringent medium is controlled by electrically modulating signals applied to opposing electrodes in the medium. The modulated beam is of plain polarized as it is transmitted through the second of the two crossed polarizers. It is then imaged by a pair of anamorphic lenses to have an elongated cross-section. The lenses are servo-controlled for relative movement to vary the size of the cross-sectional length of the elongated beam as the missle is predicted to be located down range after launch. By simultaneously controlling the size of all four separately projected beams, the control corridor is intended to maintained at a constance size with respect to the missle throughout its flight path.

The second embodiment of the guidance system beam projector in U.S. Pat. No. 3,398,918 illustrates the use of two orthogonally oriented cross-sectional beams that are simultaneously transmitted and scanned across an overlapping control area in space. The two beams are generated by a common laser generator. The beam from the generator is split in two beams which pass through corresponding amplitude modulators where they are modulated at different frequencies. The modulated beams are fed to separate scanners and anamorphic optic systems where the beams are imaged in orthogonal relationships and scanned in orthogonal directions.

U.S. Pat. No. 4,111,385 discloses a laser beam-rider guidance system which employs a synchronization beam for defining the guidance control field in space. One embodiment shows the simultaneous transmission of the synchronization beam and orthogonally oriented "x" and "y" beams, having separate pulse repetition frequency rates, repeatedly swept through the synchronization beam in non-overlapping time periods to provide coordinate location information to a missle within the synchronization beam control field. Another embodiment shows the use of an "L" junction laser source having two orthogonally oriented junctions that are separately modulated and simultaneously driven to produce the "x" and "y" beams. A rotating, scanning, prism, in combination with separate relay lenses, provides the sweeping movement to the beams with respect to the synchronization beam.

Commonly assigned U.S. Pat. No. 4,186,899 is directed to a controlled beam projector. In a first embodiment, a rectangular cross-section beam of a first size format, emitted from a correspondingly activated source, is formed in size by a clad glass fiber assembly and is directed to a lateral scanner. The scanner is synchronously timed with respect to a rotating beam chopper optical system that performs alternate rotation and de-rotation operations on the projected beams. In a second embodiment, separate rectangular cross-section beam sources are positioned so as to respectively emit orthogonally oriented beam images.

SUMMARY OF THE INVENTION

The present invention differs from the above-noted prior art systems in that a single laser source is employed in conjunction with a single electro-optical modulator, that provides a plurality of polarization states for the beam and an optical system that separately orients the beam image in accordance with the respective polarization states.

It is an object of the present invention to provide a beam source of electromagnetic radiation wherein the cross-section of the beam is elongated and is transmitted in alternate orthogonal orientations.

It is another object of the present invention to provide a beam source of electromagnetic radiation which is alternately switched by a single electro-optical modulator so as to transmit beams correspondingly orthogonally image oriented.

The above summary and objects of the invention are more fully realized by reference to the following description of the drawings.

DETAILED DESCRIPTION OF THE PREFERRED EMBODIMENT

Figure 1:
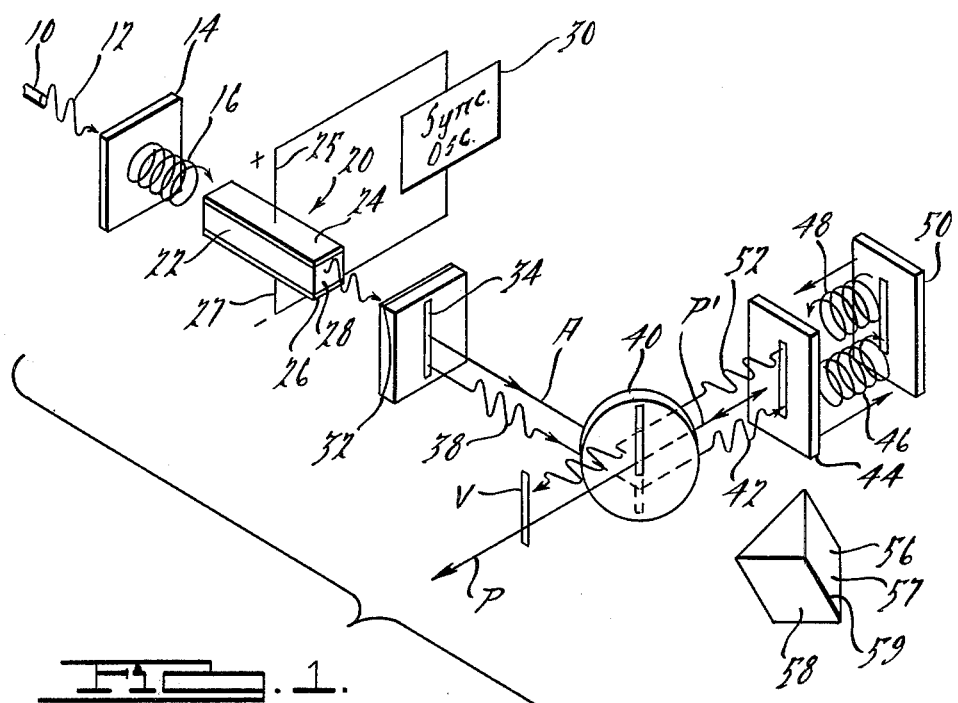
FIG. 1 is a functional diagram of the invention showing the optical path and beam image orientation when the beam is switched to a first state of polarization.
Figure 2:
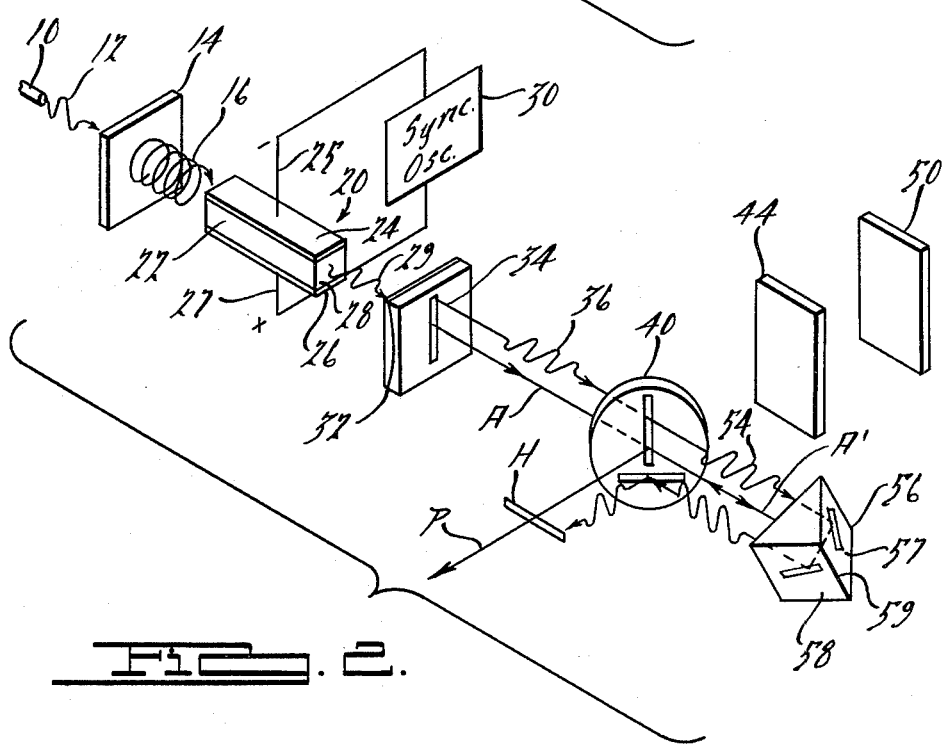
FIG. 2 is a functional diagram of the invention showing the optical path and beam image orientation when the beam is switched to a second state of polarization.

FIGS. 1 and 2 functionally illustrate the same embodiment of the present invention. The two figures differ in illustrating the different polarization states, as well as the different optical paths, that are alternately traversed by the beam radiation. Accordingly, like elements of the two figures are designated with like characters.

Referring to both FIGS. 1 and 2, a source of electromagnetic radiation 10 is shown, such as $CO_2$ laser generator, which emits a plane polarized collimated beam of electromagnetic radiation 12. A quarter-wave plate 14 lies in the path of the electromagnetic radiation beam 12 and converts the plane polarized beam to a circularly polarized beam 16. The circularly polarized beam 16 is then directed to an electro-optic modulator in the form of a Pockels cell 20. The Pockels cell 20 contains an electro-optic medium 22 and opposing electrodes 24 and 26.

When actuated with a voltage, on the order of +1700 volts, across the electrodes 24 and 26, the Pockels cell 20 functions as a quarter-wave plate to convert the circularly polarized beam to a plane polarized beam 23 exiting from face 28 having a first state of polarization. When the polarity of the voltage is reversed, to approximately −1700 volts, the Pockels cell causes the plane of polarization to be rotated by 90° so that the beam exiting face 28 is polarized in an orthogonal direction, as evidenced by beam 29 in FIG. 2.

In this embodiment, a synchronization oscillator 30 is used to apply alternating voltage signals to opposing electrodes 24 and 26 through corresponding terminals 25 and 27. Ideally, the synchronous oscillator 30 outputs a square wave signal to provide instantaneous switching between the beam being emitted in a first plane polarization state and then in a second plane polarization state.

It is possible to eliminate the need for the quarter-wave plate 14 by switching the electro-optic modulator from an optically inert state at 0 volts to a half-wave plate state at 3400 volts. At 0 volts, the modulator would not affect the plane polarized beam from the source 10; but would rotate the polarization of the plane polarized beam by 90° with a full 3400 volts applied. From a practical circuit consideration, we have found that switching between positive and negative 1700 volts is the preferable implementation and necessitates our inclusion of the quarter-wave plate 14.

For reference purposes, the first state of plane polarization 23 (FIG. 1) is defined as being vertically polarized, and the second state of plane polarization 29 (FIG. 2) is defined as being horizontally polarized.

In FIG. 1, the beam 23 emitted from face 28 of the Pockels cell 20 in its vertical polarization state is directed to an anamorphic lens assembly 32 which images the beam so as to have an elongated cross-section vertically oriented in the system. The vertically elongated and vertically plane polarized image beam 38 is directed along optic axis A to a polarized beam splitter element 40. The polarized beam splitter is oriented so as to reflect vertically plane polarized light and transmit horizontally plane polarized light. Accordingly, the vertically plane polarized image beam 38 is reflected from the plane polarized beam-splitter 40 and directed along an orthogonal axis P'. A quarter-wave plate 44 receives the image plane polarized beam 52 reflected from the polarized beam-splitter beam 40 and converts it to a circularly polarized image beam 46. A planar mirror 50 retro-reflects the circularly polarized image beam 48 back through the quarter-wave plate 44. The quarter-wave plate 44 then converts the circularly polarized reflected image beam to a horizontally plane polarized image beam 52, which is then transmitted through the polarized beam-splitter 40 along a projection image axis P as a vertically imaged beam V that is horizontally plane polarized.

When the opposite polarity of electrical signal from the synchronous oscillator 30 is applied to the Pockels cell 20, as shown in FIG. 2, the beam 29 exiting the face 28 is horizontally plane polarized. It is optically elongated, by lens assembly 32, in a vertical orientation 34 as a horizontally plane polarized beam 36. The vertically elongated and horizontally plane polarized beam 36 is directed from the lens assembly 32 along axis A where it is transmitted through the polarized beam-splitter 40 and is intercepted by the major face of a porro reflector 56. The porro reflector 56, in this case a prism, resembles a 90° isosceles triangle wherein the major face is the hypotenuse of the triangle and metallically coated reflecting faces 57 and 58 form the sides of the triangle. In this instance, the reflecting faces 57 and 58 of the porro prism reflector 56 intersect along a line 59. The line of intersection 59, is oriented approximately 45° with respect to the two polarization planes, earlier referenced as horizontal and vertical, and perpendicular to axis A' of FIG. 2. The horizontally plane polarized image beam 54 exiting from the polarized beam splitter 40 is reflected from the reflecting surface 57 of the porro prism 56 and is rotated 45°, as it is reflected to the reflecting surface 58. As the beam is reflected from the reflecting surface 58, it is rotated another 45° so that it exits from the porro prism 56 rotated a full 90° both in image orientation and plane of polarization. The vertically plane polarized beam returning along the axis A' is reflected by the polarized beam splitter 40 along projection image axis P as a horizontally imaged beam H that is vertically plane polarized.

Of course, the alternately projected image beams may be used in systems such as those described in the prior art which provide for transverse scanning and controlled magnification prior to transmission.

It will be apparent that many modifications and variations may be affected without departing from the scope of the novel concept of this invention. Therefore, it is intended by the appended claims to cover all such modifications and variations which fall within the true spirit and scope of the invention.

I claim:

1. An image rotator comprising in combination:
   means for generating a beam of electromagnetic radiation in a first state of plane polarization;
   means for selectively converting said beam of radiation to a second state of plane polarization, orthogonally oriented with respect to said first state; and
   means for imaging said selectively polarized beam into an elongated cross-sectional configuration aligned in a first one of two orthogonally oriented directions when said selectively polarized beam is in a first one of said plane polarized states and aligned in a second one of said two orthogonally oriented directions when said selectively polarized beam is in a second one of said plane polarized states.

2. An image rotator, as in claim 1, further including means for electrically actuating said selectively converting means to effect said conversion of said beam to said first and second plane polarized states.

3. An image rotator, as in claim 1, wherein said selectively converting means includes a Pockels cell connected to means for electrically actuating said cell to cause said conversion to said first and second plane polarization states.

4. An image rotator as in claim 1, wherein said imaging means includes:
   image forming optics, for shaping the selectively plane polarized beam into an elongated cross-sectional configuration aligned in a first direction;
   a polarized beam-splitter oriented to reflect the imaged beam when it is in said first plane polarized state and transmit the imaged beam when it is in said second plane polarized state;
   means for converting said reflected imaged beam in said first selected state of plane polarization to said second state of plane polarization and redirecting said imaged beam in said second state onto said polarized beam splitter where it is transmitted therethrough as a projected second state plane polarized beam having an image cross-section elongated in said first direction; and
   means for converting said transmitted imaged beam in said second selected state of plane polarization to said first state of plane polarization, while rotating said imaged beam cross-section elongation, aligned in said first direction, to said second direction and redirecting said beam onto said polarized beam splitter where it is reflected therefrom as a projected first state plane polarized beam having an image cross-section elongated in said second direction.

5. An image rotator, as in claim 4, further including circuit means for providing electrical actuating signals to said selectively converting means at predetermined time intervals and further wherein said selectively converting means is a Pockels cell, which is responsive to said electrical actuating signals to effect said conversion to said first and second plane polarization states.

6. An image rotator, as in claim 5, wherein said image forming optics, polarized beam-splitter and said transmitted converting means are positioned in a first straight line axis and said reflected converting means is positioned in a staight line projection axis that intersects said first straight line axis through said polarized beam splitter.

7. An image rotator, as in claim 6, wherein said reflected converting means includes a quarter-wave optical element and a mirror element.

8. An image rotator, as in claim 7, wherein said transmitted converting means includes a porro type reflector.

9. An image rotator, as in claim 8, wherein said porro reflector has reflecting surfaces which intersect along a corner line oriented at an angle of approximately 45° with respect to both said first and second directions.

10. An image rotator, as in claim 8, wherein said projected beams occur in alternating non-overlapping time intervals dictated by said electrically actuating signals applied to said Pockels cell.

11. An image rotator, as in claim 4, further including circuit means for providing electrical actuating signals to said selectively converting means at predetermined time intervals and further wherein said selectively converting means includes means for converting said plane polarized radiation from said generating means to a beam of circularly polarized radiation and a Pockels cell connected to said circuit means to cause a conversion of said circularly polarized radiation to said first and second plane polarization states.

12. An image rotator, as in claim 11, wherein said image forming optics, polarized beam-splitter and said transmitted converting means are positioned in a first straight line axis and said reflected converting means is positioned in a straight line projection axis that intersects said first straight line axis through said polarized beam splitter.

13. An image rotator, as in claim 12, wherein said reflected converting means includes a quarter-wave optical element and a mirror element.

14. An image rotator, as in claim 13, wherein said transmitted converting means includes a porro type reflector.

15. An image rotator, as in claim 14, wherein said porro reflector has reflecting surfaces which intersect along a corner line oriented at an angle of approximately 45° with respect to both said first and second directions.

16. An image rotator, as in claim 15, wherein said projected beams occur in alternating non-overlapping time intervals dictated by said electrically actuating signals applied to said Pockels cell.

17. An image rotator, as in claim 1, further including circuit means for providing electrical actuating signals to said selectively converting means at predetermined time intervals and further wherein said selectively converting means includes means for converting said plane polarized radiation from said generating means to a beam of circularly polarized radiation and a Pockels cell connected to said circuit means to cause a conversion of said circularly polarized radiation to said first and second plane polarization states.

* * * * *